April 18, 1950     E. C. HARTWIG     2,504,834
PULSE CONTROL CIRCUIT
Filed Jan. 18, 1946
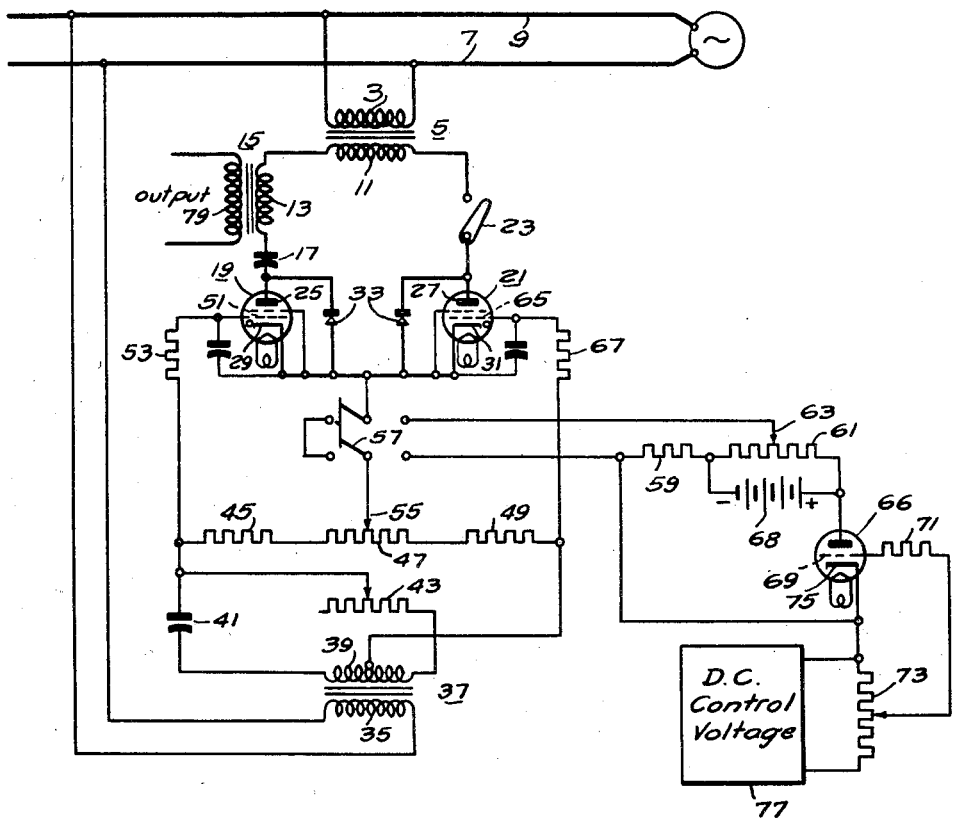
WITNESSES:
INVENTOR
Edward C. Hartwig.
BY
ATTORNEY Patented Apr. 18, 1950

2,504,834

UNITED STATES PATENT OFFICE 2,504,834

PULSE CONTROL CIRCUIT

Edward C. Hartwig, Pittsburgh, Pa., assignor to Westinghouse Electric Corporation, East Pittsburgh, Pa., a corporation of Pennsylvania Application January 18, 1946, Serial No. 642,040

10 Claims. (Cl. 323—44)

This invention relates to an electronic control circuit and has particular relation to a circuit for producing peaked voltage impulses.

In many control systems it is desirable to employ peaked voltage impulses for various purposes, such as the control of electric valves of the arc-like type. For example, electronic control systems for resistance welders often employ peaked voltage impulses in the control of thyratrons and particularly of thyratrons which are connected in direct current circuits. Moreover, it is often necessary that such voltage impulses occur at preselected phase positions with respect to an alternating current voltage supply. In addition, it is many times desirable that the phase position of the impulses be automatically shifted in accordance with a direct current control voltage for purposes of voltage compensation or current regulation.

One of the most widely used arrangements for producing peaked voltage impulses is that employing a peaking transformer energized from the alternating voltage source. Such transformers are capable of delivering a voltage impulse of very short duration relative to a half-period of the alternating voltage and having a relatively steep wave front. However, because of the well known characteristics of such peaking transformers, it is not feasible to shift the phase of the voltage impulse by more than 90 electrical degrees without switching the connections thereof. These peaking transformers also require a relatively high power phase shifting circuit in association therewith. In addition, a great many practical difficulties are encountered if it is attempted to shift the phase of the voltage impulse produced by a peaking transformer automatically in accordance with variations in a direct current control voltage.

It is, accordingly, an object of my invention to provide a novel control circuit for producing peaked voltage impulses.

Another object of my invention is to provide a novel control circuit for producing peaked voltage impulses having a preselected phase relation with respect to an alternating voltage.

A further object of my invention is to provide novel apparatus for producing peaked voltage impulses which vary automatically in phase position with respect to an alternating voltage in accordance with variations in a direct current voltage.

A still further object of my invention is to provide novel apparatus for producing peaked voltage impulses which may be varied in phase position with respect to an alternating voltage over substantially a complete half-period of the alternating voltage.

The novel features of my invention are set forth with particularity in the accompanying claims. The invention itself, however, together with its advantages and further objects thereof may be better understood from the following description of a specific embodiment thereof, when read in connection with the accompanying drawing, in which the single figure is a schematic circuit diagram of apparatus embodying my invention.

As shown in the drawing, the primary winding 3 of a supply transformer 5 is energized from a pair of alternating voltage supply lines 7 and 9. The primary winding 13 of an output transformer 15, a capacitor 17 and a pair of electric valves 19 and 21 are connected in series across the secondary winding 11 of the supply transformer 5 through a switch 23. The electric valves 19 and 21 are preferably of the arc-like type, such as thyratrons, and are connected to conduct current in opposite directions. Thus, the anode 25 of the first valve 19 is connected to one terminal of the secondary winding 11 of the supply transformer 5, while the anode 27 of the other valve 21 is connected to the other terminal of the secondary winding 11 and the cathodes 29 and 31 of the two valves 19 and 21, respectively, are connected together. An asymmetrical conductor 33, such as a rectifier, preferably of the dry type, is connected in shunt with each valve. Each rectifier 33 is arranged to offer its lower resistance to current flowing in a direction opposite to the direction of such current as may be conducted by the corresponding one of the valves 19 and 21.

The primary winding 35 of an auxiliary transformer 37 is also energized from the alternating voltage supply lines 7 and 9. The secondary winding 39 of the auxiliary transformer 37 is connected through a phase shifting circuit including a capacitor 41 and an adjustable potentiometer 43, to supply voltage across a resistor 45, a potentiometer 47 and another resistor 49 connected in series in the order named. Thus, an alternating voltage is impressed across the series connected resistors 45 and 49 and potentiometer 47 which is of the same frequency, but is displaced in phase with respect to the alternating voltage appearing across the secondary winding 11 of the supply transformer 5. The amount of phase displacement is determined by the adjustment of the potentiometer 43 in the phase shifting circuit.

The control circuit of the first valve 19 may be traced from the control grid 51 thereof, through a grid resistor 53, the resistor 45 and the left-hand portion of the potentiometer 47 to the adjustable tap 55 thereon and thence to the cathode 29. In tracing the circuit from the adjustable tap 55 on the potentiometer 47 to the cathode 29 of the valve 19, either of two paths may be followed, depending upon the position of a double-throw switch 57. If the switch 57 is in its left-hand position, the circuit is a direct connection from the adjustable tap 55 to the cathode 29. If the switch 57 is in its right-hand position, the circuit extends from the adjustable tap 55 through a resistor 59 and a portion of a voltage divider 61 to an adjustable tap 63 thereon and thence to the cathode 29.

The control circuit of the second valve 21 may be traced from the control grid 65 thereof through a grid resistor 67, the resistor 49 and the right-hand portion of the potentiometer 47 to the adjustable tap 55 thereon and thence to the cathode 31 of the valve by either of the paths just described.

The resistor 59 and the divider 61 in the control circuits of the valves 19 and 21 are connected in a closed circuit in series with an auxiliary valve 66, preferably a vacuum tube, and a suitable source 83 of substantially constant direct current voltage is connected in shunt with the voltage divider 61. It then appears that the total voltage across the resistor 59 and the portion of the divider 61 in the control circuits of the main valves 19 and 21 depends both in polarity and magnitude upon the magnitude of the current conducted through the auxiliary valve 66.

The control circuit of the auxiliary valve 66 extends from the grid 69 thereof through a grid resistor 71 and a portion of another resistor 73 to the cathode 75. A direct current control voltage from any suitable source 77 is then applied across the resistor 73. It follows that the direct current voltage supplied to the control circuits of the main valves 19 and 21 from the resistor 59 and the divider 61 is varied in accordance with variations in the direct current control voltage across resistor 73.

The operation of the apparatus will be considered first when the double-throw switch 57 is in its left-hand position. With the double-throw switch 57 so positioned, an alternating voltage is impressed in the control circuit of each of the valves 19 and 21 which is displaced in phase with respect to the alternating voltage appearing across the secondary winding 11 of the supply transformer 5. This alternating voltage in the control circuit of either of the valves 19 and 21 becomes more positive than the predetermined critical value necessary to render that valve conductive at an instant in a half-period of the alternating voltage appearing across the secondary winding 11 of the supply transformer 5, in which the anode of that valve is positive, which instant is determined by the adjustment of the potentiometer 43 in the phase shifting circuit.

After the hand switch 23 is closed, one of the main valves 19 and 21 is rendered conductive in the next half-period of the alternating voltage across the secondary winding 11 of the supply transformer 5. The particular valve to become conductive first depends upon the polarity of the next half-period following closure of the hand switch 23. If it be assumed that the polarity is such that the anode 25 of the first valve 19 is positive in the next half-period after closure of the switch 23, then the first valve 19 is rendered conductive at the preselected instant in that half-period.

When the first valve 19 becomes conductive, current flows from the secondary winding 11 through the primary winding 13 of the output transformer 15, the capacitor 17, the first valve 19, the rectifier 33 in shunt across the second valve 21 and the hand switch 23 back to the secondary winding 11. Since the capacitor 17 has no charge thereon when the first valve 19 becomes conductive, a surge of current of considerable magnitude flows through the primary winding 13 of the output transformer 15 at that instant, causing the voltage across the secondary winding 79 of the output transformer 15 to rise very rapidly. The capacitor 17 is of such size with respect to the voltage across the secondary winding 11 of the supply transformer 5 that it is charged substantially completely in less than one-half period of the alternating voltage. Preferably the capacitor 17 is arranged to be substantially completely charged in a time corresponding to about ten electrical degrees. As soon as the capacitor 17 is substantially charged, the flow of current therethrough ceases so that the first valve 19 becomes non-conductive and the voltage across the secondary winding 79 of the output transformer 15 drops substantially to zero. As a result of this operation, a very sharply-peaked impulse appears across the secondary winding 79 of the output transformer 15 at the instant the first valve 19 becomes conductive.

In the next succeeding half period of the alternating voltage, the second valve 21 is rendered conductive at a preselected instant. The previously-charged capacitor 17 is then discharged through the second valve 21, current flowing from the secondary winding 11 of the supply transformer 5 through the hand switch 23, the second valve 21, the rectifier 33 in shunt with the first valve 19, the capacitor 17 and the primary winding 13 of the output transformer 15 back to the secondary winding 11. The discharge of the capacitor 17 plus the current from the secondary winding 11 again results in a surge of current charging said capacitor 17 with an opposite polarity and producing a peaked impulse across the secondary winding 79 of the output transformer 15 of opposite polarity to the peaked impulse obtained in the previous half-period of the alternating voltage. The operation then continues with the first and second valves being rendered conductive alternately in opposite half periods of the alternating voltage.

It is to be understood that because the capacitor 17 is charged in one half period, the voltage thereon tends to make positive the anode of the valve to be rendered conductive in the next half period. Consequently, the anode of that valve actually is positive when the alternating voltage is zero at the beginning of the next half period. This enables the first and second valves to be rendered conductive at instants substantially corresponding to the zero voltage time of the alternating voltage to produce voltage impulses at those instants. Such an arrangement is sometimes highly desirable as in the system shown in my copending application, Serial No. 642,041, filed January 18, 1946, embodying the apparatus of my present invention.

Although I have shown a particular phase shifting circuit in connection with the control circuits of the main valves 19 and 21, it is to be understood that other suitable phase shifting circuits may be employed to permit the production of the peaked voltage impulses having any preselected phase position over substantially a complete half period of the alternating voltage supply.

When the double-throw switch 57 is in its right-hand position, the operation of the circuit including the secondary winding 11 of the supply transformer 5, the capacitor 17, the primary winding 13 of the output transformer 15, and the two main valves 19 and 21 remains substantially unchanged.

However, the instant at which the main valves 19 and 21 are rendered conductive is varied automatically in accordance with the direct current control voltage. For such operation, I prefer to have the alternating voltage appearing across the resistors 45 and 49 and potentiometer 47, lagging behind the alternating supply voltage by approximately 65°, although other phase displacements may be used if desired. This phase shifted alternating voltage is superimposed on the direct current voltage appearing across the resistor 59 and the portion of the divider 61 in the control circuits of the valves 19 and 21. It is then apparent that variations in the direct current voltage cause the resultant voltage impressed in the control circuits of the valves 19 and 21 become more positive than the critical value at an instant earlier or later in the corresponding half period of the alternating supply voltage. With the alternating voltage across the resistors 45 and 49 and potentiometer 47 lagging behind the supply voltage by approximately 65°, it is possible to vary the direct current voltage to cause each of the main valves 19 and 21 to be rendered conductive at any preselected instant within substantially a complete half-period of the alternating supply voltage.

Although I have shown a rectifier 33 in shunt with each of the main valves 19 and 21, it is to be understood that in some cases the rectifier may be replaced by a suitable resistor or other impedance member offering a higher impedance to current than the corresponding valve when it is conductive.

While I have shown and described a preferred embodiment of my invention, I am aware that many modifications thereof may be made without departing from the spirit of the invention. I do not intend, therefore, to limit my invention to the specific embodiment disclosed.

I claim as my invention:

1. Apparatus for producing peaked voltage impulses comprising an output transformer having a primary winding and a secondary winding, a capacitor in series with said primary winding, means adapted to function as a source of current, and means operable to form a complete conductive connection of said source across said series connected capacitor and primary winding to charge said capacitor, the components in said completely conductive connection and said capacitor being dimensioned so that said capacitor is rapidly chargeable to permit but an impulse of current therethrough.

2. Apparatus for producing peaked voltage impulses comprising an output transformer having a primary winding and a secondary winding, a capacitor in series with said primary winding, means adapted to function as a source of alternating current, and means operable to form a complete conductive connection of said source across said series connected capacitor and primary winding for an interval in each half period of said source voltage beginning at a preselected instant therein to charge said capacitor, the components in said completely conductive connection and said capacitor being dimensioned so that said capacitor is rapidly chargeable to limit the duration of current flow therethrough in each half period to a time which is short relative to the duration of a half period.

3. Apparatus for producing peaked voltage impulses which vary in phase position in accordance with variations in a direct current control voltage, comprising an output transformer having a primary winding and a secondary winding, a capacitor in series with said primary winding, means adapted to function as a source of alternating current, and means operable to form a complete conductive connection of said source across said series connected capacitor and primary winding for an interval in each half period of said source voltage beginning at a predetermined instant therein to charge said capacitor, said operable means including means responsive to said control voltage for varying said instant in accordance with variations in said control voltage, the components of said completely conductive connection and said capacitor being dimensioned so that said capacitor is rapidly chargeable to limit the duration of current flow therethrough in each half period to a time which is short relative to the duration of a half period.

4. Apparatus for producing peaked voltage impulses comprising means adapted to function as an alternating voltage source, a capacitor, an output transformer having a primary winding and a secondary winding, a pair of electric valves, said valves, primary winding and capacitor being connected in series across said source with said valves being arranged to conduct current in opposite directions, an assymmetrical conductor connected in shunt across each of said valves and offering its higher resistance to current in the same direction as that in which current may be conducted through the corresponding valve, and control means connected to said valves to cause each valve to become conductive for an interval in each half period of the source voltage in which that valve may conduct current beginning at a preselected instant therein, said capacitor being rapidly chargeable to limit the duration of current flow therethrough in each half period to a time which is short relative to the duration of a half period.

5. Apparatus for producing peaked voltage impulses comprising means adapted to function as an alternating voltage source, a capacitor, an output transformer having a primary winding and a secondary winding, a pair of electric valves, said valves, primary winding and capacitor being connected in series across said source with said valves being arranged to conduct current in opposite directions, an impedance member connected in shunt across each of said valves and offering a greater impedance than the corresponding valve when it is conductive, to current flow in the direction in which current may be conducted through said corresponding valve, and control means connected to said valves to cause each valve to become conductive for an interval in each half period of the source voltage in which that valve may conduct current beginning at a preselected instant therein, said capacitor being rapidly chargeable to limit the duration of current flow therethrough in each half period to a time which is short relative to the duration of a half period.

6. Apparatus for producing peaked voltage impulses comprising means adapted to function as an alternating voltage source, a capacitor, an output transformer having a primary winding and a secondary winding, a pair of electric valves of the arc-like type, said valves, primary winding and capacitor being connected in series across said source with said valves being arranged to conduct current in opposite directions, an assymmetrical conductor connected in shunt across each of said valves and offering its higher resistance to current in the same direction as that in which current may be conducted through the corresponding valve, and control means connected to said valves to render each valve conductive at a preselected instant in each half period of the source voltage in which that valve may conduct current, said capacitor being rapidly chargeable to limit the duration of current flow therethrough in a half period to a time which is short relative to the duration of a half period.

7. Apparatus for producing peaked voltage impulses comprising means adapted to function as an alternating voltage source, a capacitor, an output transformer having a primary winding and a secondary winding, a pair of electric valves, said valves, primary winding and capacitor being connected in series across said source with said valves being arranged to conduct current in opposite directions, a rectifier connected in shunt across each valve for conducting current in a direction opposite to that in which current may be conducted through the corresponding valve, and control means connected to said valves to cause each valve to become conductive for an interval in each half period of the source voltage in which that valve may conduct current beginning at a predetermined instant therein, said capacitor being rapidly chargeable to limit the duration of current flow therethrough in a half period to a time which is short relative to the duration of a half period.

8. Apparatus for producing peaked voltage impulses comprising means adapted to function as a main alternating voltage source, a capacitor, an output transformer having a primary winding and a secondary winding, a pair of electric valves of the arc-like type, said valves, primary winding and capacitor being connected in series across said source with said valves being arranged to conduct current in opposite directions, an asymmetrical conductor connected in shunt across each of said valves and offering its higher resistance to current in the same direction as that in which current may be conducted through the corresponding valve, and control means connected to said valves including means adapted to function as an auxiliary source of alternating voltage of the same frequency but shifted in phase with respect to said main source voltage and means for adjusting the phase of said auxiliary source voltage to cause each valve to become conductive at a pre-selected instant in each half period of the source voltage in which that valve may conduct current, said capacitor being rapidly chargeable to limit the duration of current flow therethrough in a half period to a time which is short relative to the duration of a half period.

9. Apparatus for producing peaked voltage impulses which vary in phase position in accordance with variations in a direct current control voltage comprising means adapted to function as an alternating voltage source, a capacitor, an output transformer having a primary winding and a secondary winding, a pair of electric valves, said valves, primary winding and capacitor being connected in series across said source with said valves being arranged to conduct current in opposite directions, an asymmetrical conductor connected in shunt across each of said valves and offering its higher resistance to current in the same direction as that in which current may be conducted through the corresponding valve, and control means connected to said valves to cause each valve to become conductive for an interval in each half period of the source voltage in which that valve may conduct current beginning at a predetermined instant therein and including means responsive to said control voltage for varying said instant in accordance with variations in said control voltage, said capacitor being rapidly chargeable to limit the duration of current flow therethrough in a half period to a time which is short relative to the duration of a half period.

10. Apparatus for producing peaked voltage impulses which vary in phase position in accordance with variations in a direct current control voltage comprising means adapted to function as an alternating voltage source, a capacitor, an output transformer having a primary winding and a secondary winding, a pair of electric valves of the arc-like type, said valves, primary winding and capacitor being connected in series across said source with said valves being arranged to conduct current in opposite directions, a rectifier connected in shunt across each valve for conducting current in a direction opposite to that in which current may be conducted through the corresponding valve, a control circuit connected to each valve to render each valve conductive at an instant in a half period of the source voltage in which that valve may conduct current when a voltage more positive than a predetermined critical value is impressed in said control circuit, and means for impressing in each control circuit an alternating voltage of the same frequency but displaced in phase with respect to said source voltage superimposed on a direct current voltage which varies in accordance with said control voltage whereby the impressed voltage becomes more positive than said critical value at an instant in a half period which varies with said control voltage, said capacitor being rapidly chargeable to limit the duration of current flow therethrough in a half period to a time which is short relative to the duration of a half period.

EDWARD C. HARTWIG.

REFERENCES CITED

The following references are of record in the file of this patent:

UNITED STATES PATENTS

| Number | Name | Date |
| --- | --- | --- |
| 2,294,671 | Livingston | Sept. 1, 1942 |

FOREIGN PATENTS

| Number | Country | Date |
| --- | --- | --- |
| 519,481 | Great Britain | Mar. 28, 1940 |